3,591,456
PROCESS FOR PRODUCING L-TRYPTOPHAN
Katsunobu Tanaka, Machida-shi, and Keiichi Inuzuka, Tokyo, Japan, assignors to Kyowa Hakko Kogyo Co., Ltd., Tokyo, Japan
No Drawing. Filed June 14, 1968, Ser. No. 736,987
Claims priority, application Japan, June 17, 1967, 42/38,468
Int. Cl. C12d 13/06
U.S. Cl. 195—29                           11 Claims

ABSTRACT OF THE DISCLOSURE

A process for producing L-tryptophan by fermentation from anthranilic acid which comprises culturing a hydrocarbon-assimilating microorganism under aerobic conditions in an aqueous nutrient medium containing a hydrocarbon or a mixture of hydrocarbons as the main carbon source and precursor amounts of anthranilic acid. Typical microorganisms that can be employed in the process include *Brevibacterium ketoglutamicum*, *Candida tropicalis* and *Streptomyces antibioticus*.

---

This invention relates to a process for producing L-tryptophan. More particularly, it relates to a process for the production of L-tryptophan by fermentation. Even more particularly, the invention relates to a process for the production of L-tryptophan by fermentation with microorganisms from anthranilic acid.

L-tryptophan is an important amino acid as, for example, a nutrient for animals. It has been classified as essential with respect to its growth effect in rats.

Heretofore, a process wherein indole and indolepyruvic acid have been added as precursors to microorganism systems has been used as a microbiological method of producing L-tryptophan. However, it is difficult to conduct an industrial manufacturing process for producing L-tryptophan by fermentation because these precursors are much too expensive to be used as starting materials. Another process which has been proposed comprises culturing certain kinds of true fungi under aerobic conditions in a culture medium containing anthranilic acid while maintaining the pH thereof at around 4 and, thereby, producing and accumulating L-tryptophan. However, this process also is not feasible and has not been conducted on an industrial scale. This is because of difficulties such that the growth of the microorganisms is slow, the culturing time is long, the concentration of L-tryptophan produced is low and, furthermore, a large quantity of glucose is required, all of these factors preventing this process from being economically worth-while for industrial production.

One of the objects of the present invention is to provide an improved process for the production of L-tryptophan which overcomes the disadvantages and deficiencies of the prior art methods.

Another object of the present invention is to provide a process for producing L-tryptophan by fermentation which may be carried out in an efficacious and simple manner.

A further object of the invention is to provide a process for producing L-tryptophan by fermentation which may be carried out advantageously on an industrial scale at low cost to give a high yield of product.

A still further object of the invention is to provide L-tryptophan.

These and other objects and advantages of the present invention will become apparent to those skilled in the art from a consideration of the following specification and claims.

In accordance with the present invention, and as the result of many investigations on production by fermentation with microorganisms capable of utilizing hydrocarbons, the present inventors have found that L-tryptophan is produced and accumulated in large quantities when hydrocarbon-assimilating microorganisms are cultured in an aqueous nutrient medium containing hydrocarbons as the starting material and by adding anthranilic acid to the fermentation liquor containing these hydrocarbons. Moreover, the present inventors have discovered that remarkably larger amounts of L-tryptophan are produced and accumulated when microorganisms having the property of assimilating hydrocarbons are cultured in a nutrient medium containing hydrocarbons and anthranilic acid, than in the case when microorganisms capable of producing L-tryptophan from carbohydrates are cultured in a medium containing carbohydrates and anthranilic acid.

Accordingly, the process of the present invention makes it possible to produce L-tryptophan inexpensively by using hydrocarbons as a starting material, instead of having to use a large quantity of glucose, this having been one of the defects of the methods employed in the prior art. Also, simultaneously, the amount of L-tryptophan accumulated and produced by means of the present invention with respect to the amount of carbon source used is significantly increased in the present process. It is thus clear that the process of the present invention provides significant results from an industrial point of view.

The hydrocarbons to be employed as starting materials in the present invention include any of the hydrocarbons which may be utilized by microorganisms. These include, for example, methane, ethane, propane, butane and other straight and branched-chain paraffins (alkanes) having from 5 to 30 carbon atoms, such as n-pentane, n-octane, n-decane, n-dodecane, n-hexadecane, isopentane, isooctane, etc. or cycloparaffins such as cyclohexane and cyclooctane. It is also possible to use straight- and branched-chain olefins such as pentene-2, hexene-1, octene-1, octene-2, etc., cycloolefins such as cyclohexene, aromatic hydrocarbons such as benzene, o-xylene, etc., and mixtures thereof, and mixed hydrocarbons such as kerosene, light oils, heavy oils, paraffin oils, naphtha and the like. Small amounts of other carbon sources such as carbohydrates, for example, glucose, fructose, maltose, sucrose, starch, starch hydrolysate, molasses, etc. or any other suitable carbon source such as glycerol, mannitol, sorbitol, organic acids, may be used in the fermentation medium along with the hydrocarbon, if desired. These substances may be used either singly or in mixtures of two or more.

A large number of microorganisms may be used in the present invention. These include microorganisms capable of producing L-tryptophan, such as bacteria, ray fungi, yeasts and molds, irrespective of their taxonomical positions. As exemplary thereof, results of tests carried out with various microorganisms are shown in Table 1.

TABLE 1

| Microorganisms: | Production of L-tryptophan |
|---|---|
| *Micrococcus paraffinolyticus* ATCC 15582 | ++ |
| *Arthobacter paraffineus* ATCC 15590 | + |
| *Brevibacterium ketoglutamicum* ATCC 15487 | ++ |
| *Candida tropicalis* ATCC 15114 | ++ |
| *Candida zeylanoides* ATCC 15585 | + |
| *Hansenula anomala* | ++ |
| *Aspergillus terricola* KY 87 | + |
| *Penicillium varians* KY 1044 | + |
| *Penicillium corylophilum* | + |
| *Sterptomyces antibioticus* ATCC 10382 | ++ |

Note: The culture medium employed for the tests, the results of which are shown in Table 1, was the same as that described in Example 1 hereinbelow. Anthranilic acid was added to the medium to give a concentration thereof of 2 mg./ml. after 24–48 hours after the beginning of culturing. Culturing was then continued after the addition for 48–72 hours.

It is apparent that either a synthetic culture medium or a natural nutrient medium is suitable in the present invention as long as it contains the essential nutrients for for the growth of the particular strain employed. Such nutrients are well known in the art and include substances such as a carbon source, discussed above, a nitrogen source, inorganic compounds and the like which are utilized by the microorganism employed in appropriate amounts. In addition to the carbon source, there may be employed, as a nitrogen source, various kinds of inorganic or organic salts or compounds, such as urea or ammonium slats such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. The nitrogen source also may be a single substance or a mixture of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, etc. If special nutrients are required for the microorganism employed, such as biotin or vitamins, these also should be added to the medium in suitable amounts.

Culturing is conducted with suitable fermentation parameters under aerobic conditions, such as aerobic shaking of the culture or with stirring of a submerged culture. Preferred conditions include a temperature of about 20° to 40° C. and a pH of about 4.0 to 9.0. Heat-resistant microorganisms may be cultured at about 40° to 60° C.

Anthranilic acid is suitably added to the medium at the beginning of culturing or after the growth of the cells of the microorganisms has taken place at least to some extent. Ordinarily, it is preferable to add anthranilic acid to the medium several times during the course of culturing, i.e., intermittently. Precursor amounts thereof are preferably employed.

After about 2 to 5 days of culturing under these condition, significant amounts of L-tryptiphan are found to be accumulated in the culture medium. The L-tryptophan can be recovered from the fermentation liquor after the completion of fermentation by conventional means, such as ion exchange resin treatment, extraction with solvents, precipitation withh metallic salts, chromatography or the like.

The following examples are given merely as illustrative of the present invention and are not to be considered as limiting. Unless otherwise noted, the percentages therein and throughout the application are by weight per liter of water.

EXAMPLE 1

A seed medium is prepared by inoculating one platinum loop of *Brevibacterium ketoglutamicum* ATCC 15587 into 10 ml. of a culture medium comprising 5.0% of sorbitol, 1.0% of meat extract, 1.0% of peptone and 0.3% of NaCl, the medium having a pH of 7.0. The medium is contained in a large-sized test tube, and culturing therewith is conducted under aerobic conditions at 30° C. for 24 hours.

Twenty ml. of the resultant seed culture liquor is inoculated into a 250 ml. conical flask provided with a baffle and containing 20 ml. of a fermentation medium having the following compositions:

10% n-paraffin mixture ($C_{11}$–$C_{18}$)
0.2% $KH_2PO_4$
0.2% $Na_2HPO_4$
0.1% $MgSO_4 \cdot 7H_2O$
0.005% $MnSO_4 \cdot 4H_2O$
0.1% $FeSO_4 \cdot 7H_2O$
0.0017 $ZnSO_4 \cdot 7H_2O$
0.3% cornsteep liquor
20 μg./l. thiamine
2.0% $NH_4NO_3$
2.0% $CaCO_3$ The pH of the fermentation medium is 7.0.

Culturing is then carried out with aerobic shaking of the culture at 30° C. Twenty-four hours after the beginning of the culturing, 2 ml. of an aqueous solution containing anthranilic acid neutralized with NaOH in an amount sufficient to give a concentration of 20 mg./ml. is added to the culture medium. Culturing is then subsequently conducted for 72 hours.

As a result, L-tryptophan is found to be produced and accumulated in the culture liquor in a concentration of 1.5 g./l. The L-tryptophan in the cultured liquor is adsorbed on an ion exchange resin [Dowex 50 (H type)] and is eluted with 0.3% ammonia water. The obtained effluent is concentrated, and then alcohol (ethanol) is added thereto in order to recover the L-tryptophan.

EXAMPLE 2

Culturing is conducted in the same manner as described in Example 1, except that *Candida tropicalis* ATCC 15114 is used instead of *Brevibacterium ketoglutamicum* ATCC 15587. As a result, the amount of L-tryptophan produced in the culture liquor is 2.0 g./l.

EXAMPLE 3

Culturing is again carried out in the same manner and under the same conditions as described in Example 1, except that *Streptomyces antibioticus* ATCC 10382 is employed as the microorganism. The amount of L-tryptophan produced in the resultant culture liquor is 800 mg./l.

The invention being thus described, it will be obvious that the same may be varied in many ways. Such variations are not to be regarded as a departure from the spirit and scope of the invention, and all such modifications are intended to be included within the scope of the following claims.

We claim:
1. A process for producing L-tryptophan which comprises culturing a hydrocarbon-assimilating microorganism belonging to the genus Arthrobacter, Brevibacterium or Streptomyces under aerobic conditions in an aqueous nutrient medium containing at least one hydrocarbon as the main carbon source and about 1.0 to 5.0 mg./ml. of anthranilic acid, accumulating L-tryptophan in the resultant culture liquor, and recovering said L-tryptophan therefrom.

2. The process of claim 1, wherein culturing is carried out at a tempertaure of about 20° to 60° C. and at a pH of about 4.0 to 9.0.

3. The process of claim 1, wherein the anthranilic acid is added to said nutrient medium at the initiation of culturing.

4. The process of claim 1, wherein the anthranilic acid is added to said nutrient medium intermittently during culturing.

5. The process of claim 1, wherein said hydrocarbon is an n-paraffin.

6. The process of claim 1, wherein said hydrocarbon is a petroleum derivative selected from the group consisting of kerosene, light oils, heavy oils, paraffin oils and naphtha.

7. A process for producing L-tryptophan which comprises culturing a hydrocarbon-assimilating microorganism belonging to *Brevibacterium ketoglutamicum* or *Streptomyces antibioticus* under aerobic conditions at a temperature of about 20° to 40° C. and at a pH of about 4.0 to 9.0 in an aqueous nutrient medium containing at least one hydrocarbon as the main carbon source and about 1.0 to 5.0 mg./ml. of anthranilic acid, and accumulating L-tryptophan in the resultant culture liquor, and recovering said L-tryptophan therefrom.

8. The process of claim 7, wherein said microorganism is *Brevibacterium ketoglutamicum* ATCC 15587.

9. The process of claim 7, wherein said microorganism is *Streptomyces antibioticus* ATCC 10382.

10. The process of claim 7, wherein said hydrocarbon is an n-paraffin.

11. The process of claim 7, wherein said hydrocarbon is a petroleum derivative selected from the group consisting of kerosene, light oils, heavy oils, paraffin oils and naphtha.

References Cited

UNITED STATES PATENTS 3,385,762   5/1968   Okazaki _____ 195—29

OTHER REFERENCES

Ruban et al.: "Chemical Abstracts" 16643d, 1965.
Tervi et al.: Ibid 3287b, 1963.
Shah et al.: "Agr. Biol. Chem." 31(6): 645–650, 1967 (June).

A. LOUIS MONACELL, Primary Examiner

M. D. HENSLEY, Assistant Examiner